(12) United States Patent
Hofer

(10) Patent No.: US 10,755,843 B2
(45) Date of Patent: Aug. 25, 2020

(54) METHOD AND APPARATUS FOR CONTROLLING A SOLENOID VALVE

(71) Applicant: SELECTRON SYSTEMS AG, Lyss (CH)

(72) Inventor: Urs Hofer, Kappelen (CH)

(73) Assignee: SELECTRON SYSTEMS AG (CH)

( * ) Notice: Subject to any disclaimer, the term of this patent is extended or adjusted under 35 U.S.C. 154(b) by 392 days.

(21) Appl. No.: 15/343,649

(22) Filed: Nov. 4, 2016

(65) Prior Publication Data

US 2017/0125148 A1 May 4, 2017

(30) Foreign Application Priority Data

Nov. 4, 2015 (EP) .................................... 15193055

(51) Int. Cl.
*H01F 7/18* (2006.01)
*F16K 31/06* (2006.01)

(52) U.S. Cl.
CPC ............... *H01F 7/18* (2013.01); *F16K 31/06* (2013.01)

(58) Field of Classification Search
CPC .................................. H01F 7/18; F16K 31/06
USPC ........................................................ 361/160
See application file for complete search history.

(56) References Cited

U.S. PATENT DOCUMENTS

| | | | | |
|---|---|---|---|---|
| 4,241,701 A | * | 12/1980 | Morse ....................... | F22G 5/12 122/460 |
| 6,240,350 B1 | * | 5/2001 | Endo ..................... | B62D 5/0466 180/204 |
| 2008/0238391 A1 | * | 10/2008 | Williams ............... | H01F 7/1844 323/283 |
| 2009/0005913 A1 | | 1/2009 | Fernandez et al. | |
| 2009/0085544 A1 | * | 4/2009 | Hartlieb .................... | H01F 7/18 323/283 |

FOREIGN PATENT DOCUMENTS

| | | |
|---|---|---|
| EP | 1407958 A2 | 4/2004 |
| WO | 2006037715 A1 | 4/2006 |

* cited by examiner

*Primary Examiner* — Kevin J Comber
(74) *Attorney, Agent, or Firm* — Barnes & Thornburg LLP

(57) ABSTRACT

A solenoid valve is to be controlled in such a way that an armature of the solenoid valve assumes an intermediate position between an opened position and a closed position and the armature oscillates about this intermediate position with small deflections. For this purpose, a setpoint current value is generated on the basis of a target current value, wherein a ripple current value is superimposed on the target current value; this setpoint current value is compared with a measured current value and a differential current value is generated therefrom; an actuating current value is generated from this differential current value in a current regulator; and a control signal for controlling the solenoid valve is generated from this actuating current value in a control signal generator.

7 Claims, 1 Drawing Sheet

METHOD AND APPARATUS FOR CONTROLLING A SOLENOID VALVE

CROSS-REFERENCE TO RELATED APPLICATIONS

This application claims the benefit of priority of European Patent Application No. 15 193 055.9, filed Nov. 4, 2015, the entire contents of which are incorporated herein by reference.

FIELD

The Disclosed embodiments relate to a method and to a device for controlling a solenoid valve in such a way that an armature of the solenoid valve assumes an intermediate position between an opened position and a closed position and the armature oscillates about this intermediate position with small deflections.

The Disclosed embodiments relate in particular to a method and a device for regulating an electrical coil current for a solenoid valve, the armature of which serves to set a desired volume flow in a hydraulic device. In order to reduce its static friction and/or its magnetic hysteresis a slight oscillation is continuously applied to the armature about its centre position, with the result that the solenoid valve can be switched more quickly and more precisely.

BACKGROUND

FIG. 2 presents a conventional method for controlling a solenoid valve as is known from WO 2006/037715 A1. In this conventional method, a setpoint current value Is is compared in a comparator 28 with a measured current value Im, and the differential current value Id generated therefrom is fed to a current regulator (e.g. PID regulator) 14 which generates an actuating current value Ip therefrom. A ripple current value (dither signal) Ir which is made available by a modulation signal generator (e.g. dither unit) 18 is superimposed on the actuating current value Ip before a control signal generator (e.g. PWM unit) 20 generates therefrom a control signal S for controlling the solenoid valve 12. Here, the comparator 28 and the current regulator 14 are included in a master computer 10a which is already present in a control unit, for example, of a vehicle, while the dither unit 18 and the PWM unit 16 are included in an independent computer unit 10b. In addition, a filter means 22 is provided for the measured current value Im.

The object of the disclosed embodiments is to provide an improved method and an improved device for controlling a solenoid valve, by means of which method and device an armature of the solenoid valve can assume an intermediate position between an opened position and a closed position and can oscillate about this intermediate position with small deflections, and which permit a simple design and a minor need for computing power.

This object is achieved by the teaching of the independent claims. Advantageous configurations of the invention are the subject-matter of the dependent claims.

The method according to the invention for controlling a solenoid valve comprises the following steps:
generating a setpoint current value on the basis of a target current value, wherein a ripple current value is superimposed on the target current value;
comparing the setpoint current value with a measured current value and generating a differential current value;
generating an actuating current value from the differential current value in a current regulator; and
generating a control signal for controlling the solenoid valve from the actuating current value in a control signal generator.

In contrast to the conventional method described at the beginning, the invention proposes already integrating a ripple current value into the setpoint current value in order to generate oscillations of the armature of the solenoid valve about its centre position. As a result, the entire method for controlling the solenoid valve can be carried out in just one computer unit or just one device. The total computing power required can also be reduced compared for example to the conventional method illustrated in FIG. 2.

In an advantageous configuration of the invention, the ripple current value is formed from a setpoint value of amplitude of ripple current and a setpoint value of frequency of ripple current. In other words, the amplitude and the frequency of the ripple current value can be adjusted.

In another advantageous configuration of the invention, a time profile of the ripple current value forms a triangular signal. Such a triangular signal is relatively easy to calculate, with the result that overall less computing power is required. Therefore, for example fewer reference points are necessary for the calculation of a triangular signal than for a sine signal.

In another advantageous configuration of the invention, the setpoint current value is generated by means of software technology.

In yet another advantageous configuration of the invention, an ampflication signal, which is preferably generated from a comparison of the setpoint current value with the measured current value, is superimposed on the actuating current value generated by the current regulator.

The device according to the invention for controlling a solenoid valve comprises a comparator to which a setpoint current value and a measured current value are fed and which generates a differential current value; a current regulator to which the differential current value is fed and which generates an actuating current value; and a control signal generator to which the actuating current value is fed and which generates a control signal for controlling the solenoid valve. According to the invention, the device additionally has a setpoint current value generator which is configured to generate the setpoint current value on the basis of a target current value and a ripple current value.

The same advantages can be achieved with this device as with the method of the invention as described above.

In an advantageous configuration of the invention, the setpoint current value generator is configured to generate the setpoint current value on the basis of the target current value, a setpoint value of amplitude of ripple current and a setpoint value of frequency of ripple current.

In an advantageous configuration of the invention, a time profile of the ripple current value forms a triangular signal.

In another advantageous configuration of the invention, the setpoint current value generator is configured as a software solution.

In yet another advantageous configuration of the invention, an amplifier means is additionally provided which superimposes an amplification signal, which is preferably generated from a comparison of the setpoint current value with the measured current value, on the controlling current value generated by the current regulator.

BRIEF DESCRIPTION OF FIGURES

Disclosed embodiments is explained in greater detail below with reference to the drawings, in which.

DETAILED DESCRIPTION

Figure 1:
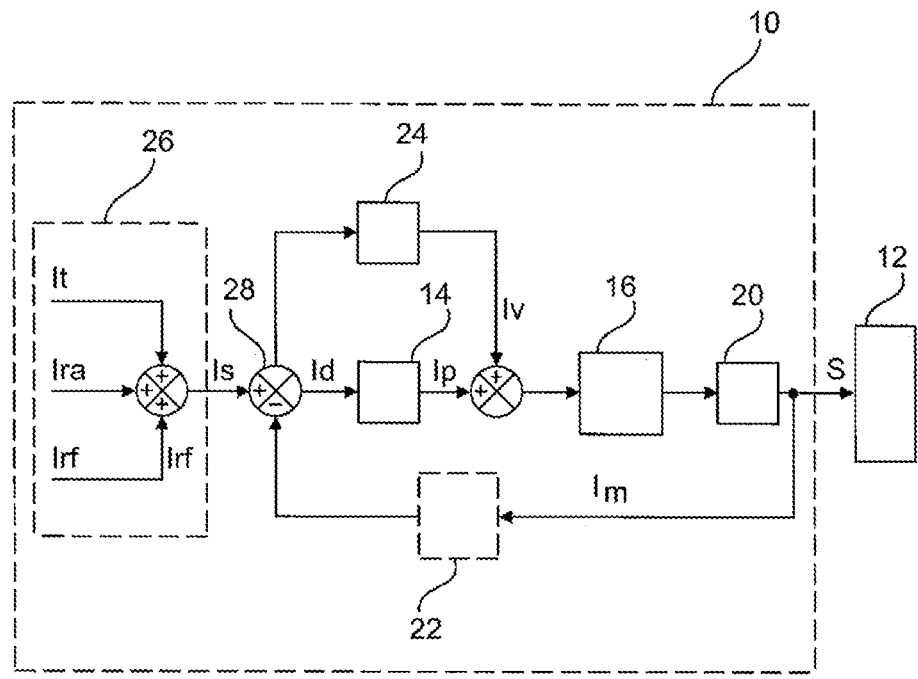
FIG. 1 shows a design of a device for controlling a solenoid valve according to the disclosed embodiments.
Figure 2:
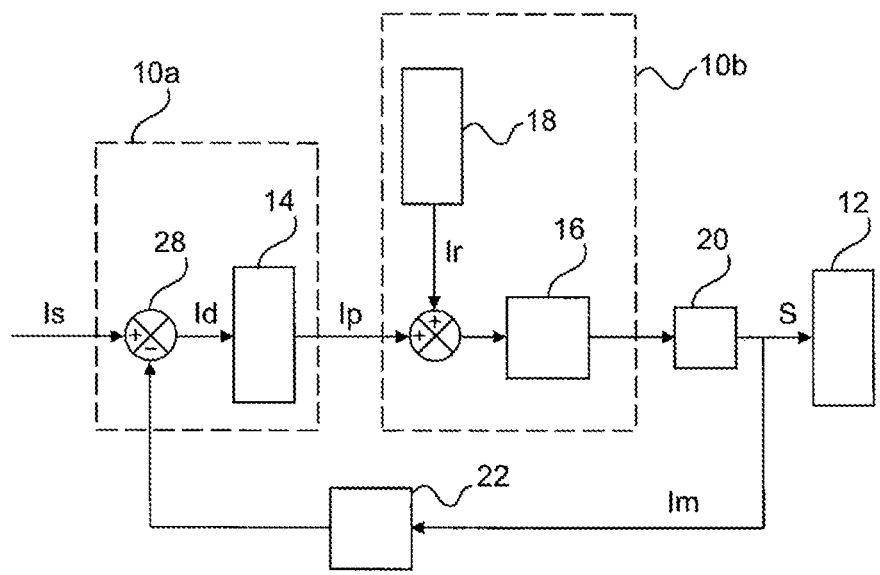
FIG. 2 shows a design of a conventional device for controlling a solenoid valve.

FIG. 1 shows the design and the method of functioning of a device 10 for controlling a solenoid valve 12 according to an exemplary embodiment of invention. The device 10 is preferably implemented in just one device or just one computer unit and is essentially formed by a control loop.

The solenoid valve 12 is, for example, a hydraulic proportional valve which is intended to move a lifting cylinder into a defined position.

The device includes a setpoint current value generator 26 which is implemented as a software solution. This setpoint current value generator 26 forms a setpoint current value Is from a target current value It and a ripple current value Ir by means of a summing element. The ripple current value Ir is composed here of a setpoint value of amplitude of ripple current Ira and a setpoint value of frequency of ripple current Irf, i.e. both the amplitude and the frequency of the ripple current value Ir can be adjusted. The setpoint current value Is forms the reference variable of the control loop.

The target current value It, the setpoint value of amplitude of ripple current Ira and the setpoint value of frequency of ripple current Irf are each preferably digital 16-bit values which are predefined by a stored program controller.

The ripple current value Ir is preferably formed here as a triangular signal. Since a triangular signal requires fewer reference points for its calculation than for example a sine signal, the triangular signal is relatively easy to calculate and correspondingly requires less computing power.

In a comparator 28, this setpoint current value Is is compared with a measured current value Im which is acquired by a current-measuring device 20 and fed back. The comparator 28 generates therefrom a differential current value Id which forms the control error of the control loop.

This differential current value Id is fed to a current regulator 14 which is preferably configured as a PID (proportional, integral and differential) regulator. The current regulator 14 then generates an actuating current value Ip which forms the actuating variable of the control loop.

The actuating current value Ip is then fed to a control signal generator 16 which is preferably configured as a PWM device (pulse-width-modulation device). The control signal generator 16 then generates a control signal S which forms the controlled variable of the control loop. The actuating current value Ip can in this case form, for example, an output variable for the pulse duty factor of the PWM control signal S.

Finally, the control signal S regulates the electrical coil current of the solenoid valve 12. The control signal S has here a sufficiently high frequency (e.g. 1 kHz or more) so that the armature of the solenoid valve 12 assumes an intermediate position, preferably a centre position between an opened position and a closed position. The ripple current value Ir which is superimposed on the target current value It causes the armature of the solenoid valve 12 to carry out a slight oscillation about this intermediate position or centre position. The frequency of the ripple current value Ir (e.g. in the region between 50 and 500 Hz) is selected to be lower here than the frequency of the pulse width modulation.

As indicated in FIG. 1, a filter means 22 can be optionally provided in the feedback path of the measured current value Im. The filter means 22 is preferably configured as a low pass filter which filters out the high-frequency portions of the measured current value Im so that the current regulator 14 can as far as possible regulate only to the mean values of the current.

In order to perform adaptations to the respective application, the device 10 preferably also has an amplifier means 24 which is preferably configured as an FFW (feed forward) amplifier. The amplifier means 24 taps the differential current value Id at the comparator 28 and superimposes it, after corresponding amplification as an amplification signal Id, on the controlling current value Ip generated by the current regulator 14.

LIST OF REFERENCE SYMBOLS

10 Control device
10a Master computer
10b Computer unit
12 Solenoid vale
14 Current regulator, e.g. PID regulator
16 Control signal generator, e.g. PWM unit
18 Modulation signal generator, e.g. dither unit
20 Current-measuring means
22 Filter means
24 Amplifier means, e.g. FFW amplifier
26 Setpoint current value generator
28 Comparator
Id Differential current value
Im Measured current value
Ip Controlling current value
Ir Ripple current value
Ira Setpoint value of amplitude of ripple current
Irf Setpoint value of frequency of ripple current
Is Setpoint current value
It Target current value
Iv Amplification signal
S Control signal

The invention claimed is:

1. A method for controlling a solenoid valve, the method comprising:
   generating a setpoint current value based on a target current value, wherein a ripple current value is superimposed on the target current value;
   comparing the setpoint current value with a measured current value to generate a differential current value;
   generating an actuating current value based on the differential current value in a current regulator; and
   generating a control signal for controlling the solenoid valve based on the actuating current value in a control signal generator,
   wherein the setpoint current value controls positioning of an armature of the solenoid valve to assume an intermediate position between an opened position and a closed position,
   wherein the armature position is controlled to oscillate about the intermediate position based on the ripple current value,
   wherein an amplification signal generated based on a comparison of the setpoint current value with the measured current value, is superimposed on the actuating current value generated by the current regulator using a feed forward amplifier, and
   wherein the ripple current value is formed based on a setpoint value of an amplitude of a ripple current and a setpoint value of a frequency of the ripple current.

2. The method according to claim 1, wherein a time profile of the ripple current value forms a triangular signal.

3. The method according to one of the preceding claims, wherein the setpoint current value is generated using software.

4. A device for controlling a solenoid valve, the device comprising:
- a comparator to which a setpoint current value and a measured current value are fed and which generates a differential current value therefrom;
- a current regulator to which the differential current value is fed and which generates an actuating current value therefrom;
- a control signal generator to which the actuating current value is fed and which generates a control signal therefrom for controlling the solenoid valve; and
- a setpoint current value generator which is configured to generate the setpoint current value based on a target current value and a ripple current value,
- wherein the setpoint current value controls positioning of an armature of the solenoid valve to assume an intermediate position between an opened position and a closed position,
- wherein the armature position is controlled to oscillate about the intermediate position based on the ripple current value,
- wherein the device further comprises a feed forward amplifier that superimposes an amplification signal on the actuating current value generated by the current regulator, wherein the amplification signal is generated based on a comparison of the setpoint current value with the measured current value, and
- wherein the setpoint current value generator is configured to generate the setpoint current value based on the target current value, a setpoint value of an amplitude of a ripple current and a setpoint value of a frequency of the ripple current.

5. The device according to claim 4, wherein a time profile of the ripple current value forms a triangular signal.

6. The device according to claim 4, wherein the setpoint current value generator is implemented as software.

7. The device according to claim 5, wherein the setpoint current value generator is implemented as software.

* * * * *